NICHOLS & MARSH.
Grinding Mill.
No. 3,479.
Patented March 13, 1844.
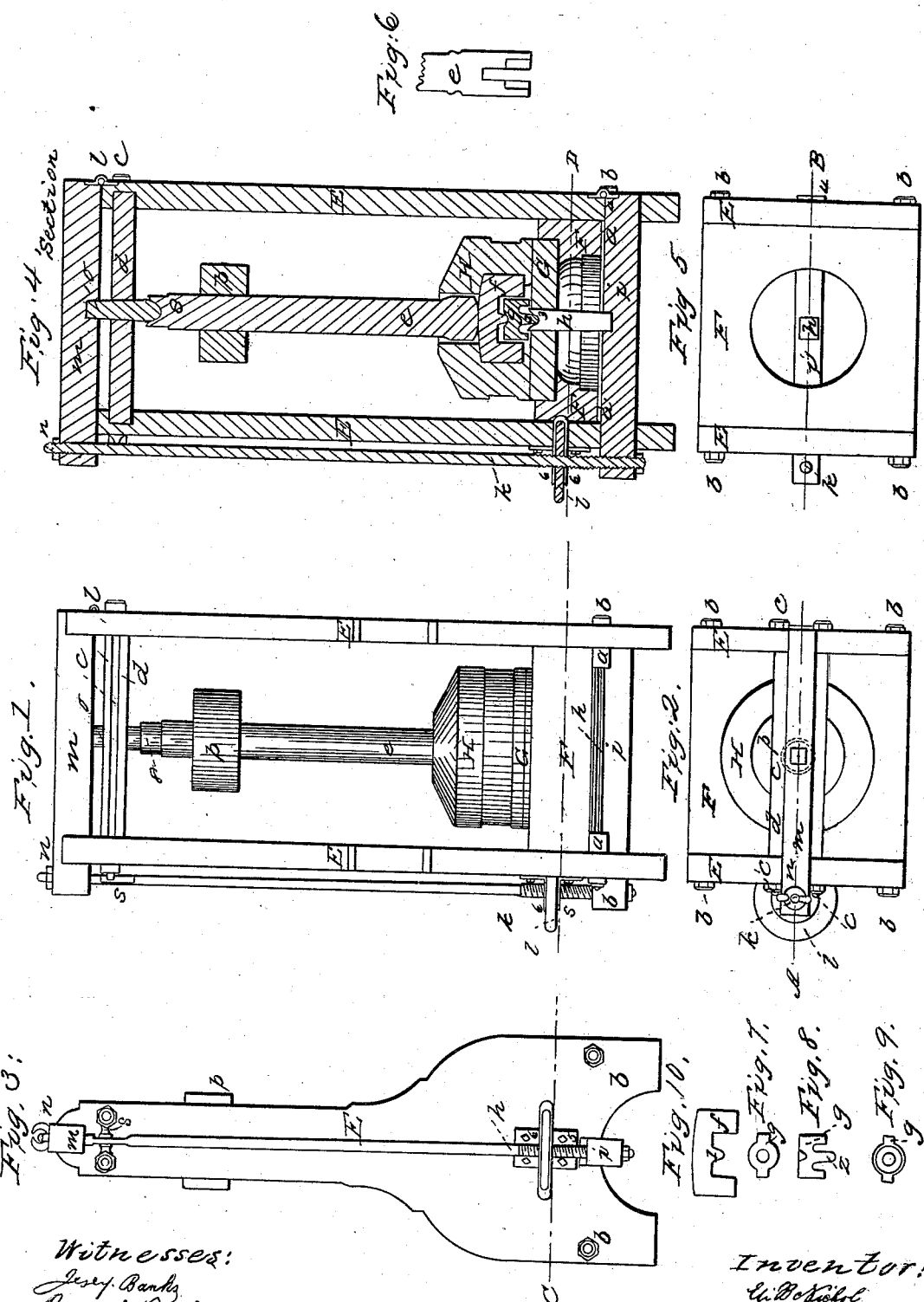

UNITED STATES PATENT OFFICE.

ELI B. NICHOLS AND DAVID MARSH, OF FAIRFIELD, CONNECTICUT.

MILL FOR GRINDING GRAIN.

Specification of Letters Patent No. 3,479, dated March 13, 1844.

*To all whom it may concern:*

Be it known that we, ELI B. NICHOLS and DAVID MARSH, both of Fairfield, in the county of Fairfield and State of Connecticut, millers, have invented and made and applied to use certain new and useful improvements in the construction, arrangement, and adjustment of the working parts of mills to be used for grinding any kind of articles or substances, for which improvements we seek Letters Patent of the United States, and that the said improvements are fully and substantially set forth and shown in the following description and in the drawings annexed to and making part of this specification, wherein—

Figure 1 is an elevation of a mill, fitted with our improvements, shown as in place for use; Fig. 2, is a plan of the same; Fig. 3, is an end elevation, showing the mode of fitting our adjusting screw and levers; Fig. 4, is a sectional elevation, at the line A, B, see Figs. 2, and 5; Fig. 5, is a plan of the parts beneath the line C, D, Figs. 1, 3, and 4; Fig. 6, is a section of the spindle shown as at right angles to that in Fig. 4. The other figures are successively referred to, and the same letters and numbers, as marks of reference, apply to the like parts, in all the figures.

E, E, are standards, between which the sliding bed frame F, is sustained on bracket ledges $a, a$. These are secured in place by bolts and nuts $b, b$, forming ties; by this mode of fitting, the bed F, and nether stone G, can be easily slidden out, to dress, or exchange the stone; $d$, is the lintel head, held in place by tie bolts and nuts $c, c$. H, is the runner stone and eye; $e$ is the main spindle, formed at the lower end as a forked cylinder, the fork taking the bale $f$, see Figs. 4, 6, and 10; the bale has a drop center, or pin 1, which takes in the cup on the top of a chuck $g$, which is inclosed in the forked cylinder, at the bottom of the spindle; the chuck $g$, has, in the under side, a cup inclosing a pin 2, which sets into a cup 3, in the upper part of the still spindle $h$, the chuck $g$, is shown at top, in Fig. 7, and sectionally in Fig. 8, and at bottom, in Fig. 9. The still spindle $h$, is set on a cross lever, or bearer, $i$, hinged or jointed at 4, at one end, the other end fitted to receive the lower end of the vertical shaft $k$, and sustained by a nut adjustable on the shaft, which is made above as a screw, working through a disk nut $l$, that is kept in place, by a bracket 5, below, and a counter-bracket 6, above the disk nut $l$, the standard E, on this side, being countersunk to pass in the edge of the disk $l$. The upper end of the shaft $k$ is squared, or sided, so that it may slide vertically, without turning, between two guide pieces $s$, screwed on with the nuts of the lintel tie bolts $c, c$, see Fig. 3. Above this a cross lever $m$, is hinged or jointed, at 7, at one end, has in the middle, the drop center $o$, the other end of the lever is fitted to pass the upper end of the shaft $k$, so that a nut $n$, on the screw at the top of the shaft, shall force down the lever $m$, and with it the drop center $o$, which goes through the lintel $d$, and takes into the cup 8, at the top of the main spindle $e$, and a drum, or gear wheel $p$, will serve to connect the spindle $e$, to any convenient motive power.

The operation of this arrangement and construction will be obvious to any workman. By raising or depressing, the lever $i$, through the shaft $k$, by the screw disk, $l$, the distance of the runner stone from the nether stone can be readily changed, and accurately adjusted; and the nut $n$, operating on the lever $m$, adjusts the drop center $o$, so as to prevent the runner stone rising, when in work. The support of the driving spindle and runner stone by the still spindle, through the construction and operation of the intermediate chuck, gives all needful security to the motion of the runner stone, and also furnishes the means, by which, on detaching the connections between the levers $i$, and $m$, and the shaft $k$, the whole of the working parts can be easily removed, for any needful purpose, and as readily replaced for use again, without disturbing or removing, any portion of the fixed parts of the mill.

The shaft $k$, may be made with a right handed screw on one end, and a left handed screw on the other end, and these, working through corresponding nuts, in the ends of the levers $i$, and $m$, will adjust the spindle and auxiliary parts, and a screw thread, cut on any intermediate part of the shaft, with set nuts above and below an eye, in the side standard, through which eye the shaft shall pass, will adjust and maintain the runner stone in place; or any similar means of effecting these adjustments, may be used, and instead of using one screw shaft, with jointed levers, a screw shaft may be placed on each side of the mill, operating at each end of the levers.

We do not intend to claim, specifically, any portion of the parts herein described, when employed otherwise than we have herein stated; but we intend to limit our claim, for what is new, and of our own invention, as follows:

We claim—

The mode described, of sustaining the runner stone H, upon the still spindle $h$, by the bale $f$, through the chuck $g$, and the combination of these parts, with the forked cylinder in the lower end of the driving spindle $e$, to furnish a means of driving the spindle and runner stone, from above, substantially as the same are described.

In witness whereof we have hereunto set our hands and seals this 29th day of December in the year one thousand eight hundred and forty-three in the presence of the witnesses subscribing hereto.

ELI B. NICHOLS. [L. S.]
    DAVID MARSH. [L. S.]

Witnesses:
    JESUP BANKS,
    BARNARD BRADY.